United States Patent [19]
Wernsing et al.

[11] Patent Number: 5,900,440
[45] Date of Patent: May 4, 1999

[54] OPEN CELLED LOW DENSITY FOAM AND METHOD OF MAKING SUCH AN OPEN CELLED FOAM

[75] Inventors: David Gerald Wernsing, Littleton; Carol Jean Claypool, Lakewood, both of Colo.

[73] Assignee: Inspec Foams, Inc., Plano, Tex.

[21] Appl. No.: 09/038,549

[22] Filed: Mar. 11, 1998

Related U.S. Application Data

[62] Division of application No. 08/915,070, Aug. 20, 1997, Pat. No. 5,786,404.

[51] Int. Cl.$^6$ ............................... C08J 9/02; C08G 18/34
[52] U.S. Cl. ..................... 521/157; 521/183; 521/184; 521/189
[58] Field of Search ................................... 521/157, 183, 521/184, 189

[56] References Cited

U.S. PATENT DOCUMENTS

| | | | |
|---|---|---|---|
| 4,604,409 | 8/1986 | Gagliani et al. | 521/157 |
| 5,093,457 | 3/1992 | Zecher et al. | 521/157 |

*Primary Examiner*—Morton Foelak
*Attorney, Agent, or Firm*—Baker & McKenzie

[57] ABSTRACT

A lightweight open celled foam, having a density no greater than 0.5 pounds per cubic foot (pcf), preferably between 0.1 and 0.4 pcf, and a ratio of imide to amide groups greater than 1 to 1 and no greater than 19 to 1, is the reaction product made from an organic polyisocyanate having at least two functional groups per molecule and a mixture of a difunctional acid and a difunctional anhydride in the presence of a tertiary amine catalyst and a surfactant, with the reactants generating carbon dioxide during the manufacturing process. The reaction is interrupted when the amount of carbon dioxide generated from the reactants is from about 1% to about 8% by weight of the total mass of the reactants. The reaction mass is transferred after the interruption step to a second stage to complete the generation of carbon dioxide and the formation of the low density foam product.

28 Claims, No Drawings

OPEN CELLED LOW DENSITY FOAM AND METHOD OF MAKING SUCH AN OPEN CELLED FOAM

This application is a division of application Ser. No. 08/915,070, filed Aug. 20, 1997 now U.S. Pat. No. 5,786,404.

BACKGROUND OF THE INVENTION

The present invention relates to open celled foams and, in particular, to open celled polyimide-polyamide foams, having densities no greater than 0.5 pounds per cubic foot, wherein the ratio of imide groups to amide groups is greater than 1 to 1 (hereinafter "polyimide-polyamide foams") and a process for forming such low density foams.

While foams and other insulations having densities of 0.5 pounds per cubic foot (pcf) or greater are quite suitable in many applications, for certain applications, such as aircraft, lower density insulations are preferred. With regard to applications for low density insulations, such as aircraft, spacecraft and the like, there is a continuing need to reduce the overall weight of the craft or vehicle by reducing the weight of the insulation materials used in the craft or vehicle without an appreciable loss in thermal and acoustical insulating performance. The low density polyimide foams of the present invention and the method of making such foams provide a solution to the need for low density, high performance insulating materials in many applications including but not limited to, aircraft, spacecraft and similar applications.

SUMMARY OF THE INVENTION

A lightweight open celled polyimide-polyamide foam, having a density no greater than 0.5 pcf and preferably from about 0.1 pcf to about 0.4 pcf, and a ratio of imide to amide groups greater than 1 to 1 and no greater than 19 to 1, is the reaction product made from an organic polyisocyanate having at least two functional groups per molecule and a mixture of a difunctional acid and a difunctional anhydride in the presence of a tertiary amine catalyst and a surfactant, which reactants during the manufacturing process generate carbon dioxide in situ. The reaction is interrupted when the amount of carbon dioxide generated from the reactants is from about 1% to about 8% by weight of the total mass of the reactants. The reaction mass is transferred after the interruption step to a second stage to complete the formation of an open celled foam product.

The surfactants used in the present invention are preferably modified polyether polysiloxanes or a nonionic, organic surfactant having a hydrophilic/lipophilic balance (HLB) of at least 12 and most preferably, an HLB value of at least 15. These surfactants have been found to produce open celled foam buns having good heights; small, uniform cells; and low thermal conductivities.

The task of forming open celled polyimide-polyamide foams having densities no greater than about 0.5 pcf and, preferably, between 0.1 pcf and 0.4 pcf, with good heights, small uniform cells, and good thermal conductivities, is much more difficult than forming open celled polyimide-polyamide foams having higher densities, such as 0.6 pcf or greater. In addition to the need to interrupt the reaction of the reaction mass when the theoretical amount of carbon dioxide generated is no greater than 50% of the theoretical amount available, the choice of surfactant used in the process is also important to obtain the best results.

For example, to decrease the density of a polyimide-polyamide foam from 0.6 pcf to 0.3 pcf, twice the amount of gas must be released from the reactants which must contain all of the gas to be released. If any of the gas (carbon dioxide) is released prematurely, the density of the polyimide-polyamide foam formed will be greater than desired. In addition, due to the amount of gas released in making such a low density polyimide-polyamide foam, it is much more difficult to control the size and uniformity of the cell structure so that the polyimide-polyamide foam formed has small, uniform cells.

It was discovered that the quality of low density open celled polyimide-polyamide foams correlates with both the amount of theoretically available carbon dioxide generated prior to the interruption of the reaction and the type of surfactant used in the reactant mixture. The reactant mixtures used to form the open celled polyimide-polyamide foams of the present invention, preferably, utilize modified polyether polysiloxanes or nonionic organic surfactants which outperform other surfactants, such as typical unmodified silicone surfactants previously used in the production of such open celled polyimide-polyamide foams. It was further discovered that nonionic organic surfactants, having hydrophilic/lipophilic balances of at least 12 and preferably 15 or greater (HLB values of at least 12 and preferably 15 or greater), formed the best quality low density, open celled polyimide-polyamide foam buns, e.g. open celled polyimide-polyamide foam buns having densities ranging from about 0.1 pcf to 0.5 pcf, with good heights, small uniform cells, and low thermal conductivities. In other words, the cell structure and the height of the foam buns produced correlated with the HLB value of the nonionic, organic surfactants.

The hydrophilic portions of these nonionic, organic surfactants are made up of ethylene oxide and the lipophilic portions of these surfactants are made up of alkyl phenols, fatty acids, propoxylated adducts, etc. Tests showed that nonionic organic surfactants with lower HLB values, i.e. with lower percentages of ethylene oxide, produced the worst looking foam buns and that the higher the HLB value of the surfactant used in the reactants, i.e. the greater the percentage of ethylene oxide in the surfactant, the better the foam buns looked.

Another group of surfactants that have proved acceptable for producing high quality low density foam buns of the present invention are silicone surfactants such as the surfactants made by Goldschmidt under the trademark BC-1280.

DESCRIPTION OF THE PREFERRED EMBODIMENTS

The open celled polyimide-polyamide foam of the present invention which has a ratio of imide to amide groups greater than 1 to 1 and no greater than 19 to 1 and the method of making the open celled polyimide-polyamide foam of the present invention relate to the open celled polyimide-polyamide foams and the method of making such open celled polyimide-polyamide foams disclosed in U.S. Pat. Nos. 4,980,387 and 4,990,543, which are hereby incorporated herein by reference.

In carrying out the process of the present invention, generally the reaction takes place in the absence of a solvent. The process is generally a two or three step process where the reactants are blended or reacted together at a low temperature (e.g. about 150° C.) which, due to the exothermic reaction, causes the temperature to rise. In one or two steps, carbon dioxide is generated from the reactants in an amount that is from about 1% to about 8% by weight of the total mass of the reactants. The reaction mixture is removed from the reaction vessel, cooled, and ground to a fine powder material. The powder material is further reacted to completion, the foaming step, by heating the powder mixture at a higher temperature from about 180° C. to 300° C. and preferably, from about 225° C. to 260° C.

Tertiary amine catalysts are used in the reaction mixture that forms the open celled polyimide-polyamide foams of the present invention. Preferably, the catalyst is N,N',N", trisubstituted symmetrical or unsymmetrical hexahydrotriazines, such as the trialkyl amino derivatives. The amount of catalyst used in the reaction mixture ranges from about 0.05% to about 10% by weight of the reaction mixture, and preferably, from about 0.1% to about 5% by weight of the reaction mixture. Additional examples of triazine catalysts and additional catalysts that may be used on a supplemental basis are set forth in U.S. Pat. Nos. 4,980,387 and 4,990,543, which have been incorporated herein by reference.

Nonionic, organic surfactants having a large hydrophilic segment are one of the preferred surfactants used in the reactant mixture of the present invention to produce low density (no greater than 0.5 pcf and preferably between 0.1 pcf and 0.4 pcf) open celled polyimide-polyamide foams with small, uniformly sized open cells. The surfactants are nonionic ethoxylates. Ethoxylates are compounds containing recurring ether linkages and are made by reacting ethylene oxide and/or higher alkylene oxides such as propylene oxide, butylene oxide, styrene oxide, etc. with various compounds or initiators containing an active hydrogen atom such as alcohols, alkylphenols, fatty acids, fatty acid amides, fatty acid esters, etc. The surfactants include, but are not limited to, the following surfactant categories: alcohol ethoxylates; alkyphenol ethoxylates; polyoxyethylene esters; ethoxylated anhydrosorbitol esters; ethoxylated natural fats, oils and waxes; ethoxylated lanolin; polyoxyethylene amines; polyoxyethylene fatty acid amides and block copolymers of ethylene oxide with higher alkylene oxides.

The number of moles of ethylene oxide per mole of the initiator can vary from 1–15 or more. Generally, the initiator, such as an alkylphenol or a propoxylated alcohol, is the hydrophobic segment of the molecule. The ethylene oxide or EO portion of the molecule is the hydrophilic segment of the molecule. These segments can be small or large depending upon the molecular weight of the initiator and the number of moles (n) of ethylene oxide added as shown in the following examples:

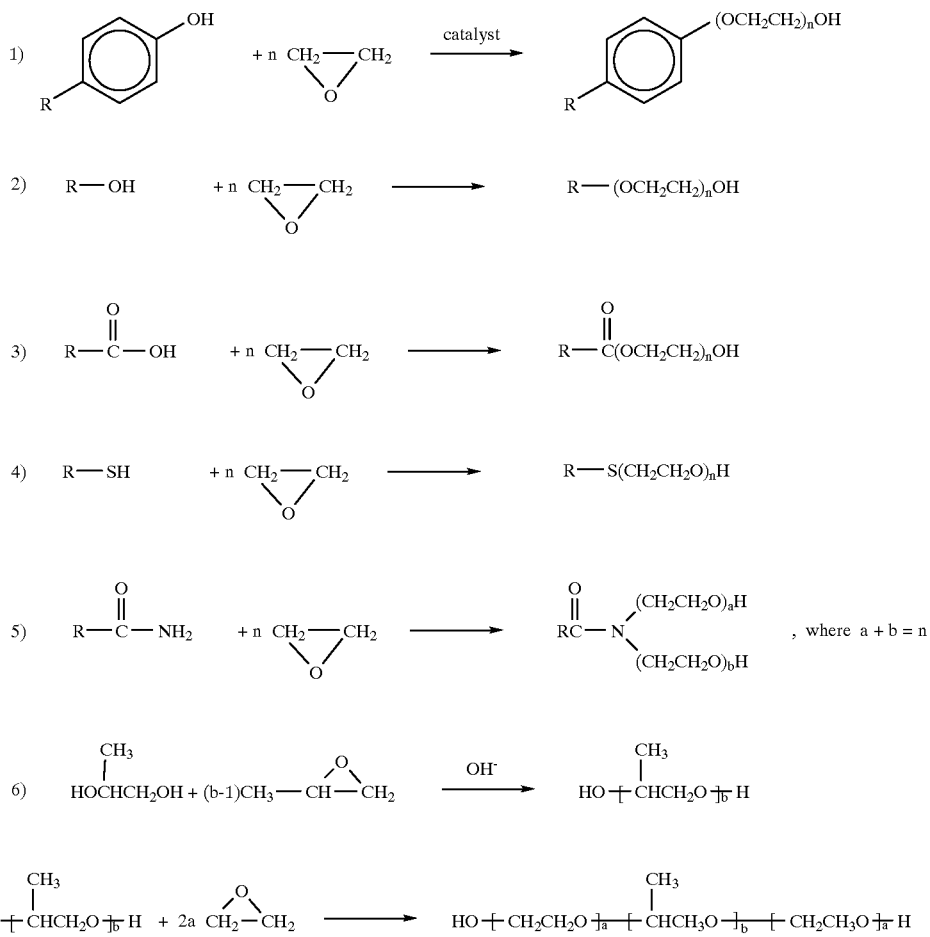

Examples of the above surfactants include, but are not limited to, the following: aliphatic alcohol ethoxylates based on the reaction products of ethylene oxide with $C_4$–$C_{24}$ alcohols, such as hexanol, octonol, decanol, dodecanol, tetradecanol, octadecanol, oleyl, trimethylnonyl, tallow, tridecyl and isodecyl. These surfactants include surfactants sold under the following trademarks: ALFONIC made by Condea Vista; ANTAROX made by Rhone-Poulene; BRIJ made by ICI; NEODOL made by Shell; and TERGITOL made by Union Carbide.

Examples of ethoxylated alkylphenols include, but are not limited to, ethoxylates of nonylphenol, octylphenol or dodecylphenol. Trademarks under which such compounds are sold include: IGEPAL made by Rhone-Poulenc; SURFONIC made by Huntsman; T-DET made by Harcros; and TRITON made by Union Carbide.

Polyoxyethylene esters include, but are not limited to, ethoxylated mono and diesters of fatty acids and aliphatic acids. These compounds include laurates, oleates, stearates, pelargonates, tallates and rosin acid esters. These polyoxyethylene esters include polyoxyethylene esters sold under the trademarks: EMEREST by Henkel; ETHOFAT made by Akzo Nobel; KESSO made by Stepan; and WITCONOL made by Witco.

Ethoxylated anhydrosorbitol mono, di and triesters include, but are not limited to, oleates, laurates, palmitates, stearates, and tallates. These surfactants include surfactants sold under the trademarks: EMSORB made by Henkel and SPAN and TWEEN made by ICI.

Ethoxylated castor oil and lanolin are examples of ethoxylated natural products. These ethoxylated natural products include ethoxylated natural products sold under the trademarks: SURFACTOL made by CasCem; EMERY made by Henkel; and RITACHOL made by R.I.T.A.

Ethoxylated fatty acid amides are usually made by reacting one or more moles of ethylene oxide with an amide made from diethanolamine that has been esterified with a fatty acid, such as lauric, hydrogenated tallow or oleic. These ethoxylated fatty acid amides include ethoxylated fatty acids sold under the trademarks: ETHOMID made by Akzo Nobel and AMIDOX made by Stepan.

Block copolymers are formed when both ethylene oxide and higher alkyl oxides, such as propylene oxide, are selectively reacted with a base compound containing an active hydrogen. Base compounds or initiators include glycols, diamines, etc. These initiators include initiators sold under the trademarks: ANTAROX made by Rhone-Poulenc and PLURONIC and TETRONIC made by BASF.

The above variations in the surfactants allow nonionic organic surfactants to be made covering a wide range of emulsification. These surfactants contain both hydrophilic and lipophilic groups on the same molecule. The emulsion characteristics of surfactants can be compared by determining their hydrophilic/lipophilic balance (HLB). HLB values range from 1 to 30 with lipophilic surfactants at the low end of the range and hydrophilic surfactants at the high end of the range. The nonionic, organic surfactants used in the reactants of the present invention to stabilize the foam are those with relatively high EO segments, i.e. surfactants which tend to be highly hydrophilic. These nonionic, organic surfactants exhibit a hydrophilic/lipophilic balance of at least 12 and preferably, of at least 15 or greater. The amount of nonionic, organic surfactant used in the reaction mixture typically ranges from about 0.05% to about 5% by weight of the reaction mixture, and preferably, from about 0.1% to about 3% by weight of the reaction mixture.

Another group of surfactants that have proved acceptable for producing high quality low density foam buns of the present invention are polyether polysiloxanes modified with side chains containing Lewis bases and hydroxyl groups. One example of this type of surfactant is BC-1280 made by Goldschmidt.

The acid/anhydrides that are utilized in the reaction mixture of the present invention are a mixture of at least two reactants. One reactant is a dianhydride while the other reactant is a dicarboxylic acid material or a material that contains both an anhydride group and a carboxylic acid group or one that can form a carboxylic acid group in situ. When the polyisocyanate reacts with the reactant containing an anhydride, the resulting reaction product is preferably an imide. In the case of a dianhydride, both anhydrides are converted to imides by virtue of the formation of carbon dioxide in situ. The second reactant which is a carboxylic group will react to form an amide with release of carbon dioxide. Examples of polycarboxylic derivatives which can be employed as the free carboxylic acids or as intramolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof are set forth in the disclosures of U.S. Pat. Nos. 4,980,387 and 4,990,543 which have been incorporated herein by reference.

A preferred group of compounds employed in the preparation of the polymers of the present invention are intramolecular anhydrides which are derived from polycarboxylic acids having at least three carboxyl groups of which at least two carboxyl groups are attached directly to an aromatic nucleus in the ortho position with respect to each other.

Examples of polyisocyanates and mixtures of two or more isocyanates which can be used in the preparation of the polymers of the present invention are set forth in the disclosures of U.S. Pat. Nos. 4,980,387 and 4,990,543, which have been incorporated herein by reference. Preferred polyisocyanates for use in the preparation of the polymers of the invention are polyisocyanates which fall into the aromatic diisocyanate category and polyisocyanates which fall into the methylenebis (phenyl isocyanate) category.

The ratio of the number of equivalents for the reactants ranges from about 0.9 to about 1.1 NCO groups to a combination of acid anhydride groups, preferably a slight excess of isocyanate groups over acid plus anhydride.

The ratio of imide to amide groups in the final product is greater than a 1 to 1 ratio and preferably, ranges from approximately 1.1 to approximately 19 imide groups per amide group. The open celled polyimide-polyamide foam produced in the process of the present invention has a density of 0.5 pounds per cubic foot or less, preferably between 0.1 pounds per cubic foot and 0.4 pounds per cubic foot. The polyimide-polyamide foam of the present invention has a high thermal stability, low shrinkage and low density. The open celled polyimide-polyamide foam of the present invention is more fire retardant than polyurethane foam and may be used in confined areas, such as aircraft cabins, below decks in ships, etc.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A lightweight open celled foam having a density no greater than 0.5 pounds per cubic foot (pcf), comprising: the reaction product of an organic polyisocyanate having at least two functional groups per molecule and a mixture of a difunctional acid and a difunctional anhydride in the presence of a tertiary amine catalyst and a surfactant, which reactants during the manufacturing process generate carbon dioxide in situ; wherein the reaction is interrupted when the amount of carbon dioxide generated is from about 1% to about 8% by weight of the total mass of the reactants; wherein the reaction mass is transferred after the interruption step to a second stage to complete the generation of carbon dioxide; and wherein the final product ratio of imide to amide groups is greater than 1 to 1 and no greater than 19 to 1.

2. The lightweight open celled foam according to claim 1, wherein: the surfactant is a nonionic, organic surfactant having a hydrophilic/lipophilic balance (HLB) of at least 12.

3. The lightweight open celled foam according to claim 2, wherein: the surfactant is selected from a group consisting of organic ethoxylates.

4. The lightweight open celled foam according to claim 2, wherein: the surfactant is selected from a group consisting of nonylphenol and octylphenol ethoxylates.

5. The lightweight open celled foam according to claim 2, wherein: the surfactant is selected from a group consisting of ethoxylates of sorbitan fatty acid esters.

6. The lightweight open celled foam according to claim 2, wherein: the surfactant is selected from a group consisting of block copolymers of ethylene oxide and propylene oxide.

7. The lightweight open celled foam according to claim 1, wherein: the density of the foam is within a range from about 0.1 pcf to about 0.4 pcf.

8. The lightweight open celled foam according to claim 7, wherein: the surfactant is a nonionic, organic surfactant having a hydrophilic/lipophilic balance (HLB) of at least 15.

9. The lightweight open celled foam according to claim 8, wherein: the surfactant is selected from a group consisting of organic ethoxylates.

10. The lightweight open celled foam according to claim 8, wherein: the surfactant is selected from a group consisting of nonylphenol and octylphenol ethoxylates.

11. The lightweight open celled foam according to claim 8, wherein: the surfactant is selected from a group consisting of ethoxylates of sorbitan fatty acid esters.

12. The lightweight open celled foam according to claim 8, wherein: the surfactant is selected from a group consisting of block copolymers of ethylene oxide and propylene oxide.

13. The lightweight open celled foam according to claim 1, wherein: the surfactant is a polyether polysiloxane modified with side chains containing Lewis bases and hydroxyl groups.

14. The lightweight open celled foam according to claim 13, wherein: the density of the foam is within a range from about 0.1 pcf to about 0.4 pcf.

15. A lightweight open celled foam having a density no greater than 0.5 pounds per cubic foot (pcf), consisting essentially of the reaction product of an organic polyisocyanate having at least two functional groups per molecule and a mixture of a difunctional acid and a difunctional anhydride in the presence of a tertiary amine catalyst and a surfactant; which reactants during the manufacturing process generate carbon dioxide in situ, wherein the reaction is interrupted when the amount of carbon dioxide generated is from about 1% to about 8% by weight of the total mass of the reactants; wherein the reaction mass is transferred after the interruption step to a second stage to complete the carbon dioxide generation; and wherein the final product ratio of imide to amide groups is greater than 1 to 1 and no greater than 19 to 1.

16. The lightweight open celled foam according to claim 15, wherein: the surfactant is a nonionic, organic surfactant having a hydrophilic/lipophilic balance (HLB) of at least 12.

17. The lightweight open celled foam according to claim 16, wherein: the surfactant is selected from a group consisting of organic ethoxylates.

18. The lightweight open celled foam according to claim 16, wherein: the surfactant is selected from a group consisting of nonylphenol and octylphenol ethoxylates.

19. The lightweight open celled foam according to claim 16, wherein: the surfactant is selected from a group consisting of ethoxylates of sorbitan fatty acid esters.

20. The lightweight open celled foam according to claim 16, wherein: the surfactant is selected from a group consisting of block copolymers of ethylene oxide and propylene oxide.

21. The lightweight open celled foam according to claim 15, wherein: the density of the foam is within a range from about 0.1 pcf to about 0.4 pcf.

22. The lightweight open celled foam according to claim 21, wherein: the surfactant is a nonionic, organic surfactant having a hydrophilic/lipophilic balance (HLB) of at least 15.

23. The lightweight open celled foam according to claim 22, wherein: the surfactant is selected from a group consisting of organic ethoxylates.

24. The lightweight open celled foam according to claim 22, wherein: the surfactant is selected from a group consisting of nonylphenol and octylphenol ethoxylates.

25. The lightweight open celled foam according to claim 22, wherein: the surfactant is selected from a group consisting of ethoxylates of sorbitan fatty acid esters.

26. The lightweight open celled foam according to claim 22, wherein: the surfactant is selected from a group consisting of block copolymers of ethylene oxide and propylene oxide.

27. The lightweight open celled foam according to claim 15, wherein: the surfactant is a polyether polysiloxane modified with additional side chains containing Lewis bases and hydroxyl groups.

28. The lightweight open celled foam according to claim 27, wherein: the density of the foam is within a range from about 0.1 pcf to about 0.4 pcf.

* * * * *